United States Patent
Anezaki et al.

(10) Patent No.: US 7,661,401 B2
(45) Date of Patent: Feb. 16, 2010

(54) LASER TYPE ENGINE IGNITION DEVICE

(75) Inventors: Yukinobu Anezaki, Nagoya (JP); Kenji Kanehara, Toyohashi (JP); Aki Abe, Okazaki (JP); Tohru Yoshinaga, Okazaki (JP); Takunori Taira, Okazaki (JP)

(73) Assignees: Denso Corporation, Kariya (JP); Nipoon Soken, Inc., Nishio (JP); Inter-University Research Institute Corporation National Institutes of Natural Sciences, Tokyo (JP)

( * ) Notice: Subject to any disclaimer, the term of this patent is extended or adjusted under 35 U.S.C. 154(b) by 327 days.

(21) Appl. No.: 11/413,058

(22) Filed: Apr. 28, 2006

(65) Prior Publication Data

US 2006/0243238 A1 Nov. 2, 2006

(30) Foreign Application Priority Data

Apr. 28, 2005 (JP) ............... 2005-132191

(51) Int. Cl.
 *F02B 19/00* (2006.01)
 *F02P 23/00* (2006.01)
 *F23C 15/00* (2006.01)
(52) U.S. Cl. ....................... 123/143 B; 431/1
(58) Field of Classification Search ............. 123/143 B, 123/143 R; 372/23; 431/1
 See application file for complete search history.

(56) References Cited

U.S. PATENT DOCUMENTS

| | | | | |
|---|---|---|---|---|
| 4,416,226 A * | 11/1983 | Nishida et al. | .......... | 123/143 B |
| 5,756,924 A * | 5/1998 | Early | .......... | 102/201 |
| 5,876,195 A * | 3/1999 | Early | .......... | 431/11 |
| 5,923,260 A * | 7/1999 | Endo et al. | .......... | 340/630 |
| 6,289,029 B1 * | 9/2001 | Goto et al. | .......... | 372/32 |
| 6,532,069 B1 * | 3/2003 | Otsuki et al. | .......... | 356/338 |
| 6,676,402 B1 * | 1/2004 | Early et al. | .......... | 431/1 |
| 6,795,198 B1 * | 9/2004 | Fuchs et al. | .......... | 356/521 |
| 6,796,278 B2 * | 9/2004 | Ryan, III | .......... | 123/143 B |
| 6,802,290 B1 * | 10/2004 | Wintner et al. | .......... | 123/143 B |
| 7,062,953 B2 * | 6/2006 | Yamano et al. | .......... | 73/31.05 |
| 2003/0138005 A1 * | 7/2003 | Kan et al. | .......... | 372/25 |
| 2004/0168662 A1 * | 9/2004 | Wintner et al. | .......... | 123/143 B |
| 2006/0037572 A1 * | 2/2006 | Yalin et al. | .......... | 123/143 B |
| 2007/0280324 A1 * | 12/2007 | Piccinno | .......... | 372/70 |
| 2009/0074023 A1 * | 3/2009 | Wadsworth | .......... | 372/50.1 |

FOREIGN PATENT DOCUMENTS

JP 10-196471 7/1998

* cited by examiner

*Primary Examiner*—Stephen K Cronin
*Assistant Examiner*—Sizo B Vilakazi
(74) *Attorney, Agent, or Firm*—Nixon & Vanderhye PC

(57) ABSTRACT

A laser type ignition device for an internal combustion engine includes a laser oscillator mounted in the internal combustion engine so as to focus its laser beam on an air-fuel mixture supplied into the combustion chamber, a pressure sensor for detecting pressure in the combustion chamber, a power source for the laser oscillator and a control unit for controlling the power source to supply the laser oscillator with the current whose amount changes according to the pressure in the combustion chamber. The power of the laser beam increases as the pressure in the combustion chamber decreases to completely ignite the air-fuel mixture.

16 Claims, 7 Drawing Sheets

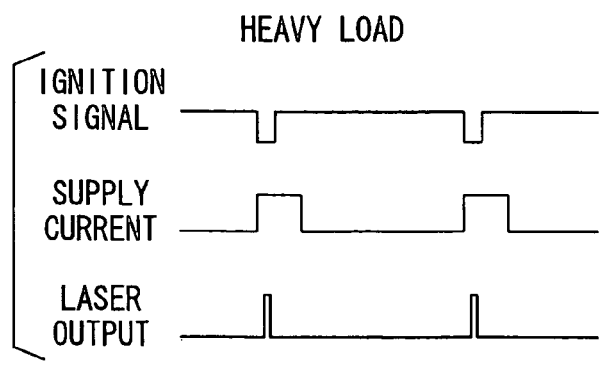
FIG. 5A
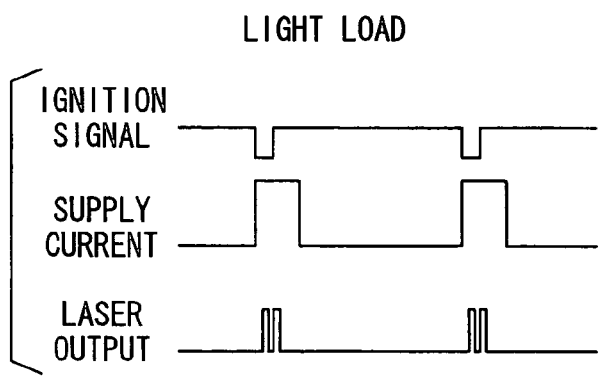
FIG. 5B
FIG. 6
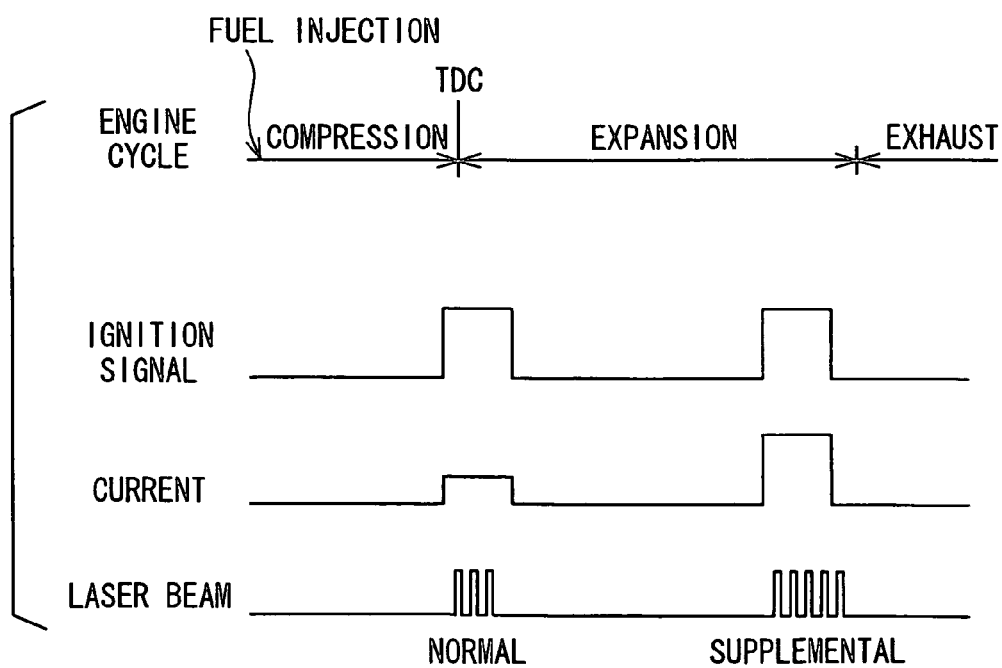

LASER TYPE ENGINE IGNITION DEVICE

CROSS REFERENCE TO RELATED APPLICATION

The present application is based on and claims priority from Japanese Patent Application 2005-132191, filed Apr. 28, 2005, the contents of which are incorporated herein by reference.

BACKGROUND OF THE INVENTION

1. Field of the Invention

The present invention relates to a laser type engine ignition device for igniting an air-fuel mixture supplied into a combustion chamber of the engine by a laser.

2. Description of the Related Art

Usually, the ignition condition of the combustion chamber changes very much according to engine operating condition, pressure, temperature, engine rotation speed, engine load, etc. Although it is necessary to properly control laser oscillation in order to secure complete ignition and a sufficient combustion speed, a conventional laser type ignition device, such as disclosed in JP-A-10-196471, can not sufficiently control laser oscillation, so that a complete ignition or a combustion speed can not be provided.

Generally, when the energy density of the laser beam at a condensing position becomes a threshold value, a breakdown takes place resulting in generation of plasma, which causes fuel combustion.

As a means to increase laser peak power, there is a switching technology to generate short pulses. In particular, a solid-state laser oscillator that uses a saturable absorber as a Q-switching element to be stimulated by a laser diode is noteworthy. Such a solid-state laser oscillator is disclosed in JP-A-2003-198019. However, the output laser power of such a solid-state laser oscillator is still insufficient for stable engine operation.

SUMMARY OF THE INVENTION

Therefore, an object of the invention is to provide an improved laser type engine ignition device that can sufficiently control laser oscillation according to various engine operating conditions, thereby securing a complete ignition and a proper combustion speed.

According to a feature of the invention, a laser type ignition device for an internal combustion engine includes a power source, a laser oscillator and a control unit for controlling an amount of current supplied to the laser oscillator according to an engine operating condition.

Therefore, the ignition device can always provide desirable engine operation at various engine conditions.

Preferably, the control unit controls the power source to supply current according to pressure in the combustion chamber, wherein the control unit may control the power source to increase the amount of current as the pressure decreases.

The laser type ignition device may include an arrangement for detecting a density of the air-fuel mixture. The arrangement detects the density according to intensity of scattered light coming from the combustion chamber, and the control unit controls the power source to supply current the amount of which changes according to the density of the air-fuel mixture. The control unit preferably controls the power source to increase the amount of current as the density decreases.

Further, the control unit may control the power source and the laser oscillator to provide multiple laser beams when the amount of current supplied thereto becomes a threshold level.

In addition, the control unit may controls the power source and the laser oscillator to provide supplemental laser beam after the ignition timing to burn residual gases.

Another object of the invention is to provide a laser type engine ignition system that effectively ignites air-fuel mixture by reducing laser pulse duration to increase peak power density.

According to a feature of the invention, a laser type ignition device that includes a power source, a laser oscillator with a pumping source and a light resonator for outputting a laser beam on an air-fuel mixture in the combustion chamber, and a control circuit for controlling the laser oscillator according to an engine operating condition, in which: the laser resonator is comprised of a pumping source for emitting pumping light; a laser medium for radiating light when receiving the pumping light; a coating formed on the light incident end thereof to pass the incident pumping light and totally reflect the light radiated therein; a saturable absorber, disposed next to the laser medium, for absorbing less the light transmitted from the laser medium as the power of the light increases and becoming transparent when the power of the light transmitted from the laser medium is higher than a threshold value; and a reflecting member for reflecting a portion of the light transmitted from the saturable absorber and passing remainder of the light.

With the above combination, the length of the light resonator can be shortened, thereby reducing the pulse duration of the laser beam and increasing the power density at air-fuel mixture on the focal point.

In the above laser type ignition device: the laser medium may include a reflection coating on the end thereof opposite the light incident end; the saturable absorber may be made of Cr:YAG to reduce the length of the light resonator; the laser medium and saturable absorber may be disposed closed to each other; the saturable absorber may include a reflection coating on the end thereof opposite the light incident end to omit a mirror; the laser medium may be formed of Nd:YAG with a coating that reflects 99% of a light having wave length of 1064 nm and a coating that passes 95% of the pumping light having wave length of 808 nm coated on the light incident end of the laser medium.

In the laser type ignition device having the saturable absorber formed of Cr:YAG, the concentration of chromium and the thickness of the saturable absorber is adjusted to have a prescribed transmittance of 20-50% with the wave length being 1064 nm; and a coating that reflects 50-70% of the light having wave length of 1064 nm may be coated on the output end thereof.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 5A is a timing diagram showing a time relationship between ignition signals, current supplied to the laser oscillator and laser outputs when engine load is comparatively high, and FIG. 5B is a timing diagram showing a time relationship between ignition signals, current supplied to the laser oscillator and laser outputs when engine load is comparatively low;

FIG. 6 is a timing diagram showing a time relationship between engine strokes, ignition signals, current supplied to the laser oscillator and laser outputs when a modified laser type ignition device according to the first embodiment is applied;

DETAILED DESCRIPTION OF THE PREFERRED EMBODIMENTS

A laser type ignition device 100 according to the first embodiment of the invention will be described with reference to FIGS. 1-6.

Figure 1:
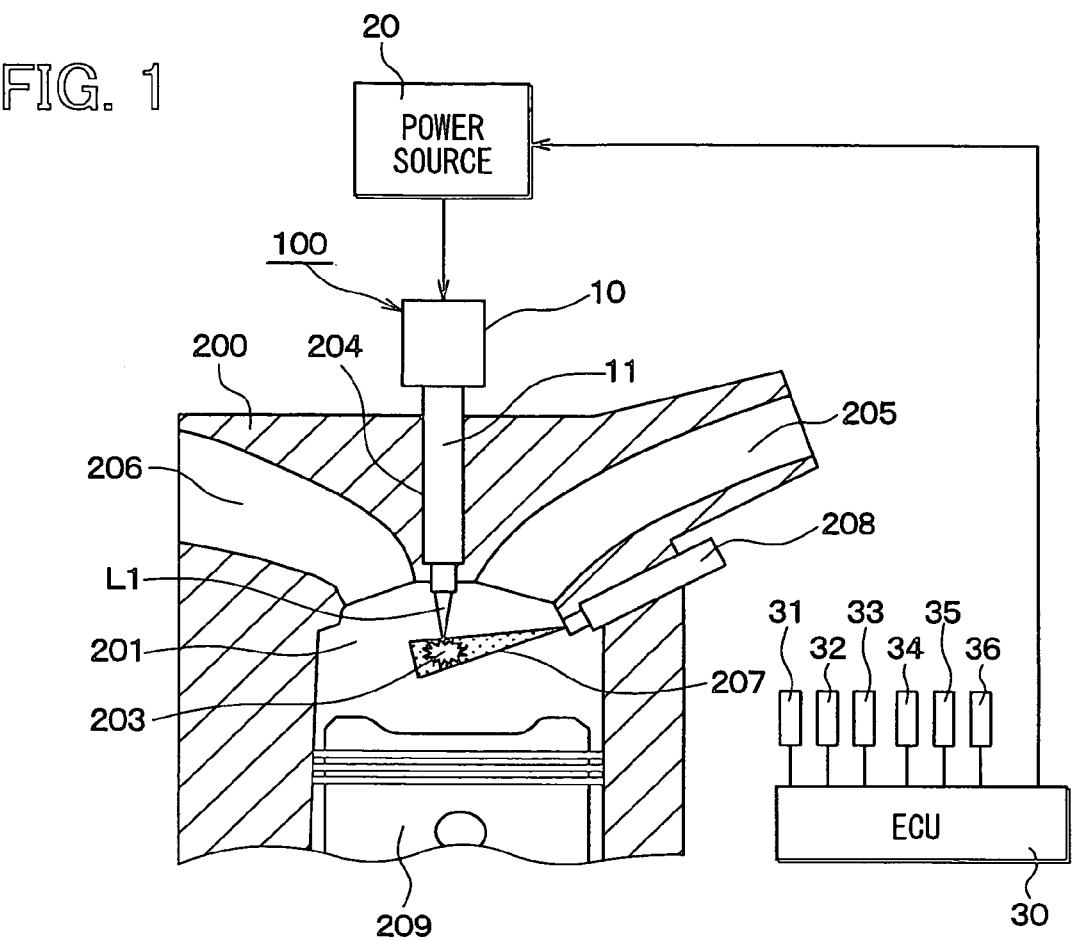
FIG. 1 is a schematic diagram illustrating a laser type ignition device according to the first embodiment of the invention mounted in an internal combustion engine.

The laser type ignition device 100 is mounted on a portion of an engine cylinder head 200 near an engine combustion chamber 201, as shown in FIG. 1. Reference numerals 205, 206, 207, 208, 209 respectively indicate an intake manifold, an exhaust manifold, an air-fuel mixture, a fuel injector and a piston. The laser type ignition device 100 includes a laser oscillator 10 that provides a laser beam L1, an electric power source 20, an ECU 30 for controlling current supplied to the laser oscillator 10 and various sensors 31-36 for detecting engine conditions.

Figure 2:
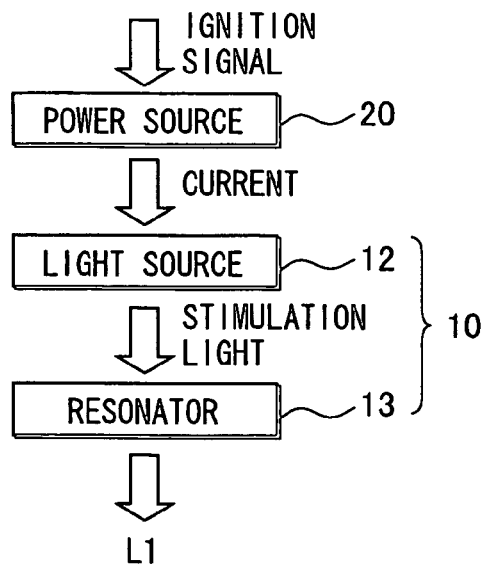
FIG. 2 is a flow diagram illustrating operation of the laser type ignition device according to the first embodiment.
Figure 10:
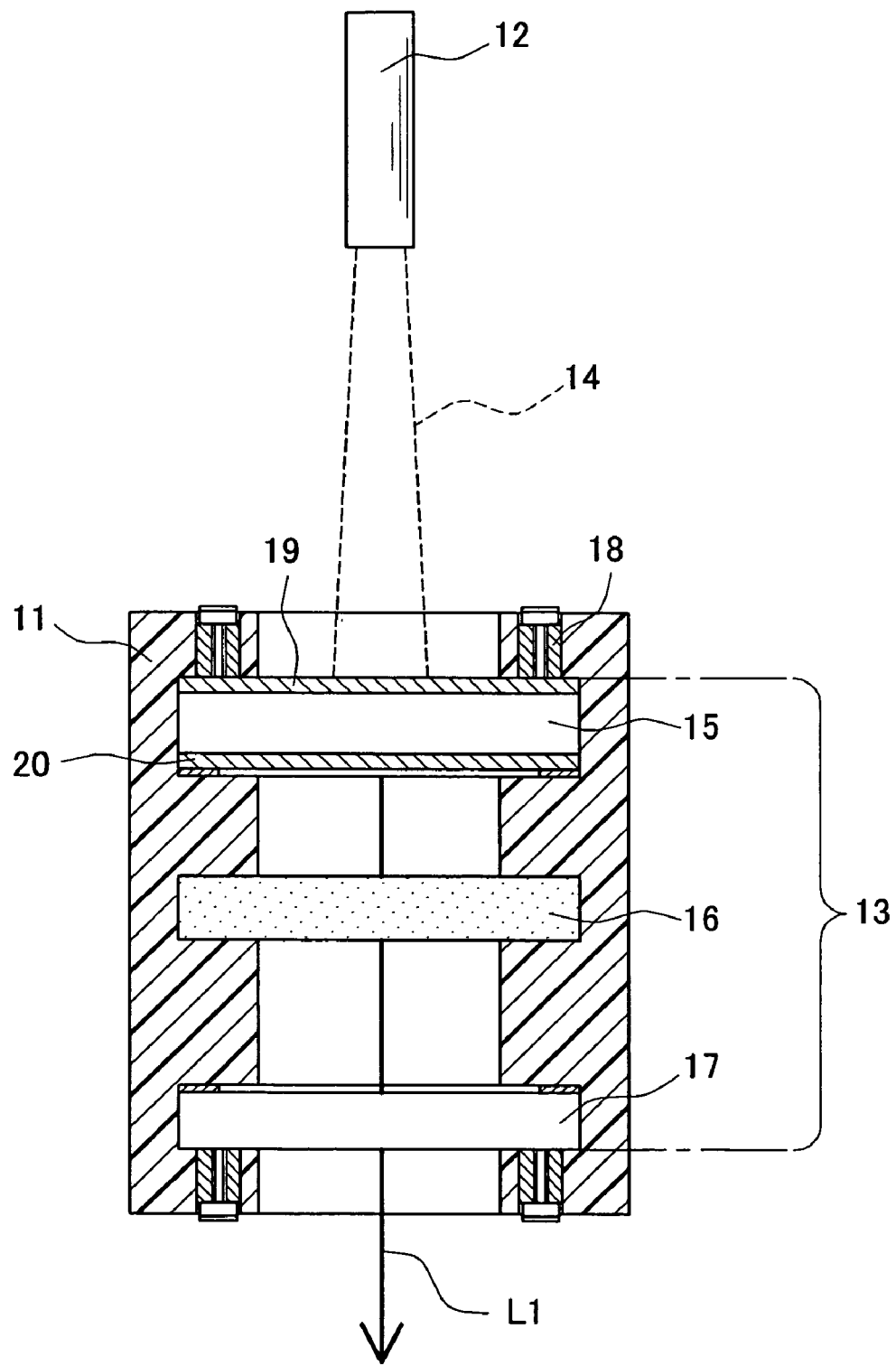
FIG. 10 is a schematic longitudinal sectional view of an embodiment of the laser oscillator of the laser type ignition device according to the above embodiments of the invention.

As shown in FIGS. 1, 2 and 10, the laser oscillator 10 includes a laser unit case 11, a laser diode (stimulation pumping source) 12 and a light resonator 13. The laser diode 12 and the light resonator 13 are held in the laser unit case 11. The laser oscillator 10 also includes various optical elements for conducting the laser beam L1 to the combustion chamber 201, such as a beam expander and a lens for focusing the laser beam L1 on a focal point 203. The laser unit case 11 is made of resin, metal or ceramics and has a hollow cylindrical shape to hold the laser diode 12 and the light resonator 13 therein. The laser oscillator 10 is inserted into a hole 204 formed in the cylinder head 200 to reach the combustion chamber 201 and fixed to the cylinder head 200 by means of a screw thread.

The laser diode 12 emits pumping light 14 when an ignition signal is sent from the ECU 30 and current is supplied to the laser oscillator 10 from the power source 20. The light resonator 13 generates a laser beam L1 when it is pumped.

The power source 20 is a drive circuit formed on a circuit board. The power source 20 is controlled by the ECU 30 to drive the laser diode 12. In other words, the ECU 30 sends an ignition signal to the power source 20 to supply current to the laser oscillator 10. The amount of current supplied to the laser oscillator 10 is controlled according to an engine condition such as a pressure in the engine combustion chamber 201.

The laser diode 12 is constituted of a laser diode or a flash lamp. As shown in FIG. 10, the light resonator 13 is disposed in the hollow portion of the unit case 11 under the laser diode 12. The light resonator 13 is constituted of a laser medium 15, such as a medium of Nd:YAG crystal, and a saturable absorber 16, such as an absorber made of Cr:YAG crystal, which are disposed in the resonance light path, and a mirror 17 disposed at the end opposite the light incident end thereof. They are positioned at a suitable distance to secure parallelism, which is adjusted by a parallelism adjusting tool. The laser medium 15 has a total reflection coating 19 at the light incident end thereof. The total reflection coating 19 resonates the light together with the mirror 17. The laser medium 15 emits light when pumped by pumping light from the laser diode 12. For example, the laser diode 12 emits pumping light of about 810 nm to stimulate neodymium (Nd) ions that are included in the Nd:YAG crystal laser medium upward.

The saturable absorber 16 serves as a passive Q-switch element. The saturable absorber 16 absorbs less amount of incident light as the power of the incident light becomes higher. In other words, the saturable absorber 16 absorbs incident light when the power of the incident light is not higher than a threshold value of over-saturation and becomes saturable and transparent if the power of the incident light is higher than the threshold value. The light resonator 13 resonates the light that has passed through the saturable absorber 16 when the saturable absorber 16 is transparent and emits a laser beam L1, which is a part of the resonated light, from the saturable absorber 16.

As the amount of current supplied from the power source 20 increases, the laser oscillator 10 outputs multiple laser beams, as described later. A portion of the light that has passed the laser medium 15 passes through the mirror 17, while the rest of the light is reflected by the mirror 17.

The sensors 31-36 detect various engine conditions: a pressure sensor 31 measures pressure in the combustion chamber 201; a throttle valve sensor 32 measures throttle opening; an intake air sensor 33 measures the amount of intake air of the engine; an intake pressure sensor 34 measures pressure of the intake manifold; an EGR sensor 35 measures EGR rate; and an intake air temperature sensor 36 measures temperature of intake air of the engine. The ECU 30 controls the power source 20 according to one or some of the engine conditions to control the power of the laser beam L1 to be focused on the air-fuel mixture 207 in the combustion chamber 201. The ECU 30 also controls, based on signals of the various sensors 32-36, the amount of fuel to be injected, the position of the focal point 203 and the power of the laser beam L1, and provides an injection signal and an ignition signal.

When the ECU 30 sends the injection signal to the injector 208, the injector 208 injects fuel into the combustion chamber 201 to form the air-fuel mixture 207. The ECU 30 concurrently sends the ignition signal and pressure data to the power source 20, which supplies an amount of electric current calculated by the ECU 30 to the laser oscillator 10.

In the laser oscillator 10, the pumping light 14 is emitted from the laser diode 12. The pumping light passes through the laser medium 15 and the saturable absorber 16. Then, the pumping light is repeatedly reflected by the mirror 17 and the coating 19, which are respectively disposed on the opposite ends of the light resonator 13, to increase the output power thereof. When the power of the pumping light is smaller than a threshold value, the saturable absorber is so opaque that the Q-value of the light resonator 13 is too small for the laser oscillation. As the power of the pumping light gradually increases, the laser medium 15 is more stimulated. When the power of the pumping light reaches a threshold value, absorption of the saturable absorber 16 sharply reduces and becomes transparent, so that the Q-value of the light resonator increases. Accordingly, laser oscillation takes place, and the pulsed laser beam L1 is emitted from the light resonator 13. The laser beam L1 is conducted to the focal point 203 in the combustion chamber 201, as shown in FIG. 1, to ignite the air-fuel mixture 207.

Figure 3:
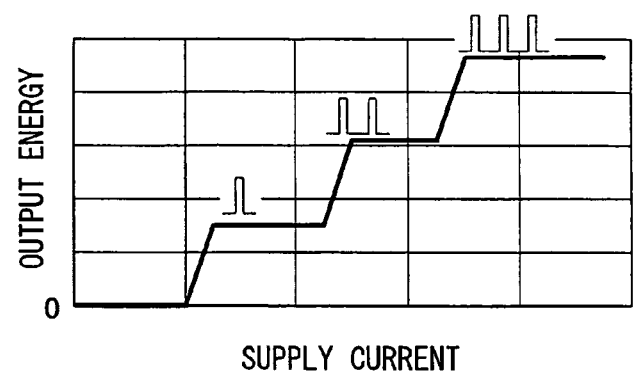
FIG. 3 is a graph showing a relationship of voltage applied to a laser oscillator with output energy and oscillation times of the laser oscillator.

The laser oscillator 10 outputs multiple beams when the amount of current supplied thereto becomes a threshold value, as shown in FIG. 3. The output energy, the number of laser beams and the period in which the laser beams are outputted increase stepwise as the amount of current supplied to the laser oscillator 10 increases.

Figure 4:
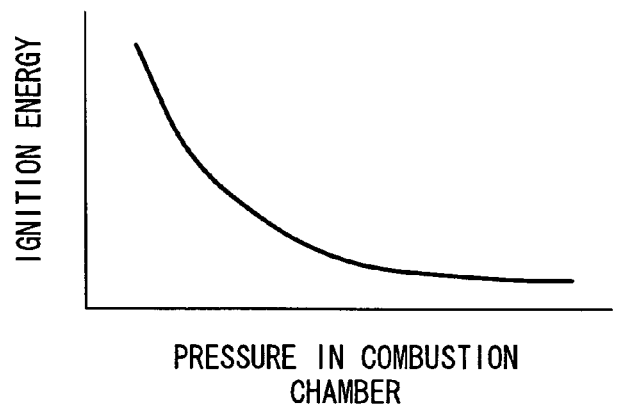
FIG. 4 is a graph showing a relationship between output energy of a laser beam and pressure in the engine combustion chamber.

The amount of current supplied to the laser oscillator 10 is controlled by the ECU 30 according to the pressure in the combustion chamber 201. It has been found that the amount of current to be supplied to the laser oscillator 10 in order to ignite the air-fuel mixture 207 decreases as the pressure in the combustion chamber 201 increases, as shown in FIG. 4.

The electric current supply to the laser oscillator 10 starts when the pulse-shape ignition signal falls down at its leading edge. When an engine load is heavier and the pressure in the combustion chamber 201 is higher, the power of the laser beam that is necessary to ignite air-fuel mixture 207 is lower, as shown in FIG. 5A (single-beam ignition). On the other hand, the power of the laser beam that is necessary to ignite air-fuel mixture 207 is so high that multi laser beams are necessary when the engine load is lighter, as shown in FIG. 5B (multiple-beam-ignition). The laser multiple beams or multiple-beam-ignition can completely ignite the air-fuel mixture 207 even if the density of the air-fuel mixture at the focal point 203 is not uniform.

Usually, the amount of fuel supplied to an engine is increased when the engine is started. Accordingly, an unburned air-fuel mixture or residual gases may remain in the combustion chamber if the laser beam ignition is carried out once each engine cycle.

In order to improve this problem, a supplemental multiple-beam-ignition is carried out in the expansion stroke of the engine cycle, as shown in FIG. 6. This supplemental multiple-beam-ignition is effective to burn out carbon and residual gases in the combustion chamber and increase the temperature of the exhaust gas to activate a catalytic converter. Because the pressure in the combustion chamber in the expansion stroke decreases, the multiple-beam-ignition of higher output power is more effective.

Figure 7:
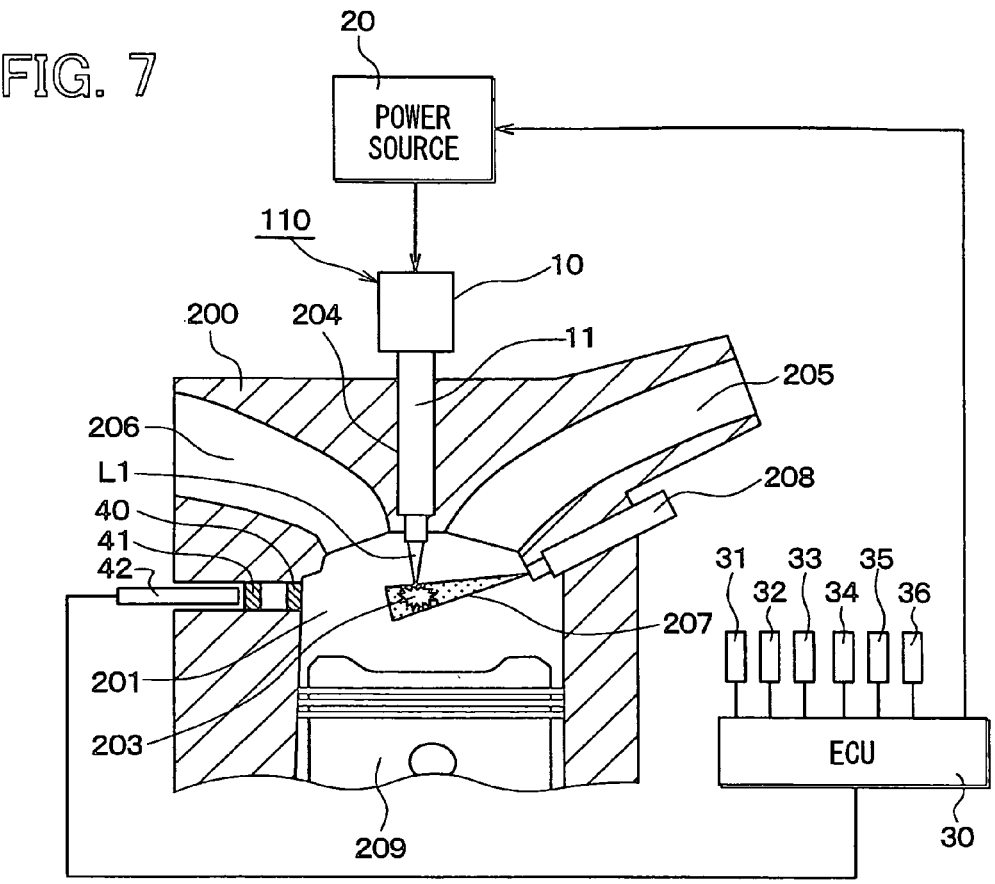
FIG. 7 is a schematic diagram illustrating a laser type ignition device according to the second embodiment of the invention mounted in an internal combustion engine.
Figure 8:
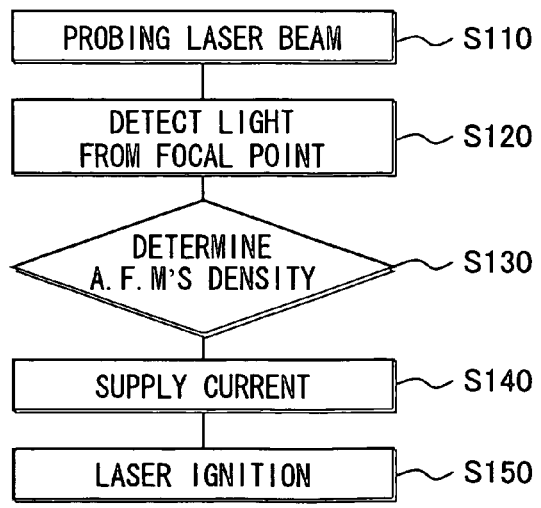
FIG. 8 is a flow diagram illustrating operation of the laser type ignition device according to the second embodiment.

A laser type ignition device 110 according to the second embodiment of the invention will be described with reference to FIGS. 7, 8 and 9.

Incidentally, the same reference numerals represent the same or substantially the same portion, part or component as in the first embodiment, hereafter.

The laser type ignition device 110 is equipped with an arrangement for detecting air-fuel mixture density. The arrangement is constituted of an observing window 40, a bandpass filter 41 and a photo detector 42. The observing window 40 is formed at a portion of the engine cylinder head 200 where the focal point 203 can be observed and closed by a transparent glass plate. The band pass filter 41 and the photo detector 42 are disposed in the window, as shown in FIG. 7. The above mixture density detecting arrangement can be integrated with the laser oscillator 10 and held in the case 11 thereof. In this case no such glass plate is necessary.

The laser oscillator 10 outputs, before its outputting the igniting laser beam L1, a probe laser beam whose power is less than the igniting laser beam L1. As shown in FIG. 8, the probe laser beam is focused on the focal point 203 at S110, the photo detector 42 detects the intensity of scattered light coming from the focal point 203 through the observing window 40 and the bandpass filter 41 at S120. Then, the output signal of the photo detector 42 is sent to the ECU 30 as data of the air-fuel mixture density to determine the air-fuel mixture density at S130, because the intensity of the scattered light changes as the density of the air-fuel mixture changes. The ECU 30 also determines the amount of electric current to be supplied to the laser oscillator 10 at S140. The power of the laser necessary to ignite the air-fuel mixture 207 and the air-fuel mixture density have a relationship similar to the relationship between the power of the laser necessary to ignite the air-fuel mixture 207 and the pressure in the combustion chamber shown in FIG. 4. In other words, the amount of current to be supplied to the laser oscillator 10 in order to ignite the air-fuel mixture 207 increases as the density of the air-fuel mixture 207 decreases.

Thereafter, at S150, the ECU 30 controls the power source 20 as described in the description of the first embodiment.

Figure 9A:
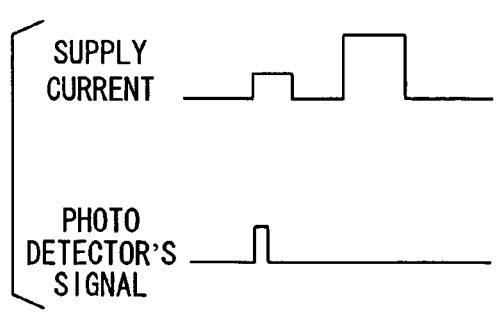
FIG. 9A is a timing diagram showing a time relationship between current supplied to the laser oscillator and laser outputs when the density of air-fuel mixture before ignition timing is comparatively high.
Figure 9B:
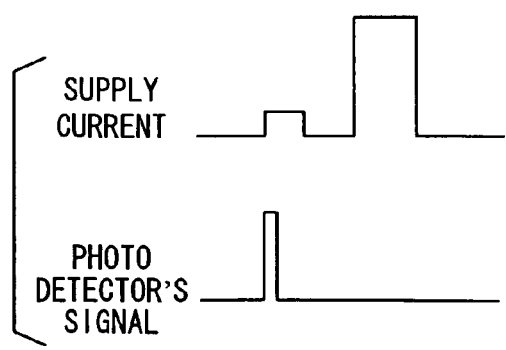
FIG. 9B is a timing diagram showing a time relationship between current supplied to the laser oscillator and laser outputs when the density of air-fuel mixture before ignition timing is comparatively low.

When the output signal of the photo detector 42 is comparatively small, as shown in FIG. 9A, the air-fuel mixture density is high, so that a small amount of current is to be supplied to the laser oscillator 10. On the other hand, the air-fuel mixture density is low when the output signal of the photo detector 42 is small, so that a large amount of current is to be supplied to the laser oscillator 10, as shown in FIG. 9B. Because the bandpass filter 41 only passes light having the same wave length as the laser beam, light having other wave lengths and noises can be removed from the data. The bandpass filter 41 also protects the photo detector 42 from an excessive amount of light.

Some preferred embodiments of the laser oscillator 10 will be described below with reference to FIGS. 10-11.

A light reflective coating 20 may be coated on the end of the laser medium 15 opposite the light incident end as shown in FIG. 10. The light reflective coating 20 makes the pumping light reenter the laser medium 15 and increases the intensity of the pumping light without additional power.

Figure 11:
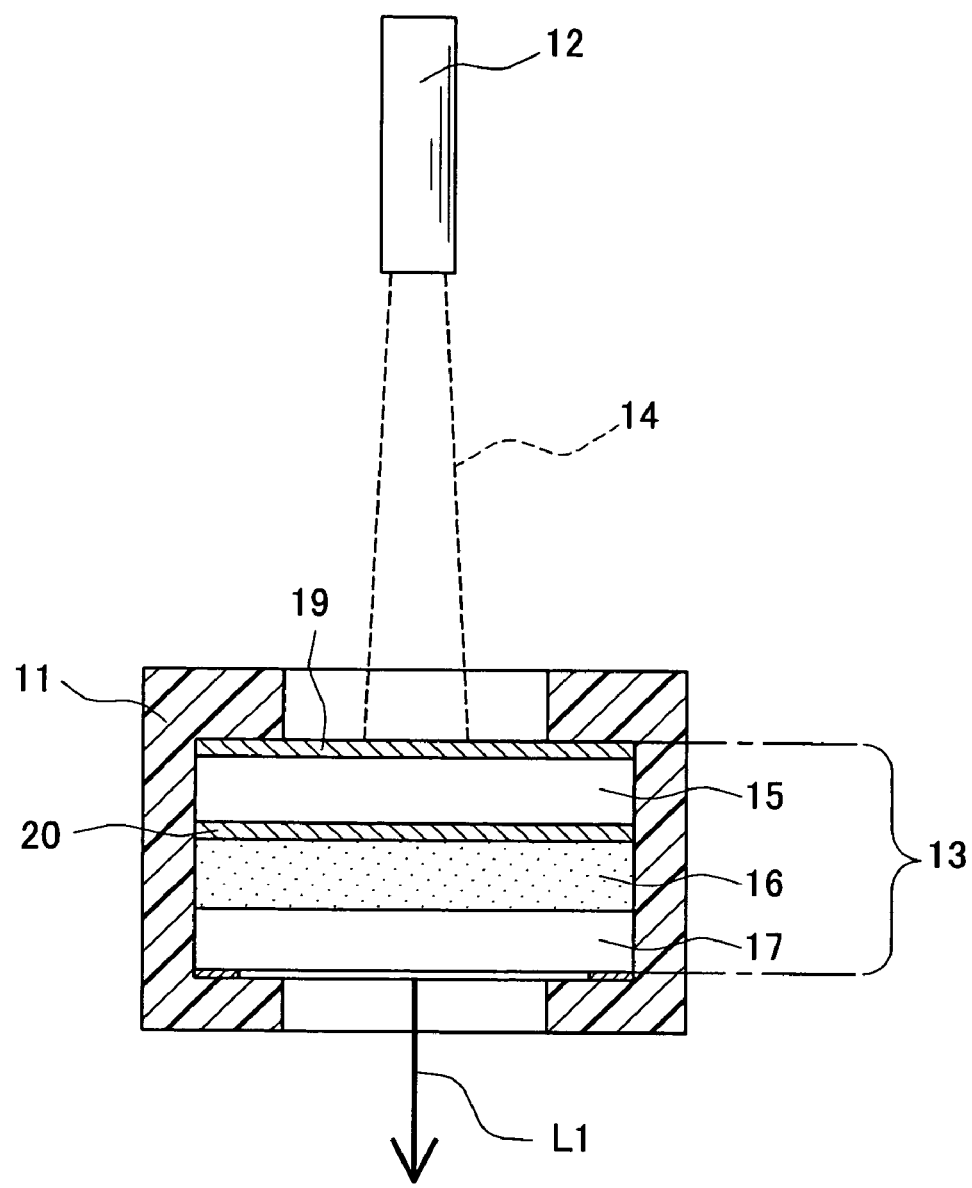
FIG. 11 is a schematic longitudinal sectional view of a modified embodiment of the laser oscillator of the laser type ignition device according to the invention.

The laser medium 15, the saturable absorber 16, and the mirror 17 are lined up very closely, as shown in FIG. 11, to reduce the length of the laser resonator 13.

Figure 12:
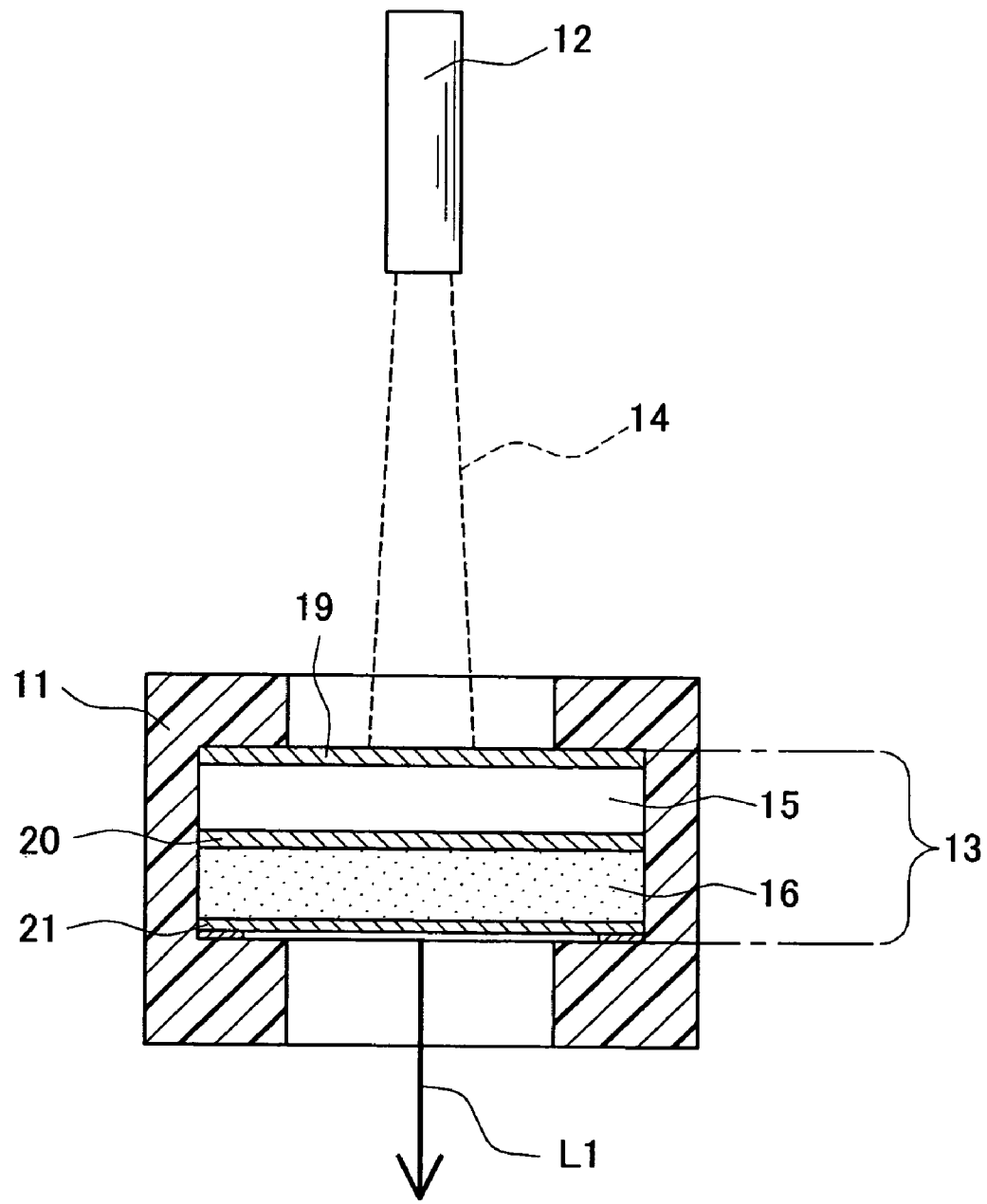
FIG. 12 is a schematic longitudinal sectional view of another modified embodiment of the laser oscillator of the laser type ignition device according to the invention.

The mirror 17 is replaced with a reflective coating 21 coated on the end of the saturable absorber 16 opposite the light incident end, as shown in FIG. 12. Therefore, the length of the laser resonator 13 is reduced.

If the laser medium 15 and the saturable absorber 16 are respectively formed of Nd:YAG and Cr:YAG, the following coatings are preferable:

a coating that reflects 99% of a light having wave length of 1064 nm and a coating that passes 95% of the pumping light having wave length of 808 nm are coated on the light incident end of the laser medium 15;

a coating that reflects 95% of the pumping light having wave length 808 and a coating that passes 95% of the light having wave length of 1064 nm are coated on the end of the laser medium 15 opposite the light incident end;

the concentration of chromium and the thickness of the saturable absorber are adjusted to have a prescribed transmittance of 20-50% with the wave length being 1064 nm; and a coating that reflects 50-70% of the light having wave length of 1064 nm is coated on the mirror 17.

Thus, the length of the laser medium 15 can be reduced to a half of it without the coatings, so that the pulse duration of the laser beam can be reduced to 2 ns or less.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A laser type ignition device for an internal combustion engine having a combustion chamber, said device comprising:
    a power source;
    a laser oscillator fixed to said internal combustion engine near said combustion chamber and powered by said power source to ignite an air-fuel mixture in the combustion chamber; and
    control means for controlling said power source to supply current to said laser oscillator according to an engine operating load, wherein:
    said laser oscillator provides a single laser beam when the amount of current supplied thereto is not larger than a threshold level and multiple laser beams when the amount of current supplied thereto becomes larger than the threshold level; and
    said control means increases the amount of current supplied to said laser oscillator to an amount larger than the threshold level when the engine load becomes lower than a preset level.

2. The laser type ignition device as claimed in claim 1, wherein said control means controls said power source to supply current according to pressure in the combustion chamber.

3. The laser type ignition device as claimed in claim 2, wherein said control means controls said power source to increase the amount of current supplied to said laser oscillator as the pressure decreases.

4. The laser type ignition device as claimed in claim 1, further comprising:
    an arrangement for detecting a density of the air-fuel mixture according to intensity of scattered light coming from the combustion chamber,
    wherein said control means controls said power source to supply current to said laser oscillator to provide a probe laser beam before ignition timing and to change the amount of current supplied to the laser oscillator at the ignition timing according to detected density of the air-fuel mixture.

5. The laser type ignition device as claimed in claim 4, wherein said control means controls said power source to increase the amount of current supplied to said laser oscillator as the density decreases and decreases the amount of current as the density increases.

6. The laser type ignition device as claimed in claim 1, wherein control means controls said power source and said laser oscillator to provide supplemental laser beam after the ignition timing.

7. A laser type ignition device for an internal combustion engine having a combustion chamber comprising:
    a laser oscillator mounted in the internal combustion engine so as to focus its laser beam on an air-fuel mixture supplied into the combustion chamber;
    detecting means for detecting an engine operating condition;
    power source means for supplying current to the laser oscillator; and
    control means for controlling the power source means to change an amount of the current according to the engine operating load, wherein:
    said laser oscillator provides a single laser beam when the amount of current supplied thereto is not larger than a threshold level and multiple laser beams when the amount of current supplied thereto becomes larger than the threshold level; and
    said control means increases the amount of current supplied to said laser oscillator to an amount larger than the threshold level when the engine load becomes lower than a preset level.

8. The laser type ignition device as claimed in claim 7, wherein:
    said detecting means comprises a pressure sensor for detecting pressure in the combustion chamber; and
    said control means controls said power source means to supply current according to the pressure detected by said pressure sensor.

9. The laser type ignition device as claimed in claim 8, wherein said control means controls said power source means to increase the amount of current supplied to said laser oscillator as the pressure in the combustion chamber decreases.

10. The laser type ignition device as claimed in claim 7, wherein:
    said detecting means includes an air-fuel mixture density sensing mean for detecting a density of the air-fuel mixture; and
    said control means controls said power source means to change the amount of current supplied to the laser oscillator at the ignition timing according to the density of the air-fuel mixture.

11. The laser type ignition device as claimed in claim 10, wherein:
    said control means controls said power source means to supply current to said laser oscillator to emit a probe laser beam before ignition timing; and
    said air-fuel mixture density sensing means comprises means for detecting intensity of scattered light coming from the combustion chamber when said control means emits the probe laser.

12. The laser type ignition device as claimed in claim 11, wherein said control means controls said power source means to increase the amount of current supplied to said laser oscillator as the density decreases.

13. The laser type ignition device as claimed in claim 7, wherein said control means controls said power source means and said laser oscillator to provide supplemental laser beam after the ignition timing.

14. A method of igniting an air-fuel mixture supplied to a combustion chamber of an internal combustion engine by a laser oscillator, said method comprising:
    disposing said laser oscillator to focus its laser beam on the air-fuel mixture;
    detecting an engine load;
    supplying the laser oscillator with current whose amount changes according to the engine load at ignition timing, wherein:

said laser oscillator is arranged to provide a single laser beam when the amount of current supplied thereto is not larger than a threshold level and multiple laser beams when the amount of current supplied thereto becomes larger than the threshold level; and the amount of current is increased to an amount larger than the threshold level when the engine load becomes lower than a preset level.

15. A method of igniting an air-fuel mixture supplied to a combustion chamber of an internal combustion engine by a laser oscillator, said method comprising:

disposing said laser oscillator to focus its laser beam on the air-fuel mixture; detecting pressure in the combustion chamber;

supplying the laser oscillator with current whose amount changes according to the pressure in the combustion chamber to emit laser beam at ignition timing, wherein:

said laser oscillator is arranged to provide a single laser beam when the amount of current supplied thereto is not larger than a threshold level and multiple laser beams when the amount of current supplied thereto becomes larger than the threshold level; and the amount of current is increased to an amount larger than the threshold level when the engine load becomes lower than a preset level.

16. A method of igniting an air-fuel mixture supplied to a combustion chamber of an internal combustion engine by a laser oscillator, said method comprising:

disposing said laser oscillator to focus its laser beam on the air-fuel mixture;

detecting density of air-fuel mixture in the combustion chamber;

supplying the laser oscillator with current whose amount changes according to the pressure in the combustion chamber and the density of the air-fuel mixture, wherein:

said laser oscillator is arranged to provide a single laser beam when the amount of current supplied thereto is not larger than a threshold level and multiple laser beams when the amount of current supplied thereto becomes larger than the threshold level; and the amount of current is increased to an amount larger than the threshold level when the engine load becomes lower than a preset level.

* * * * *